April 3, 1956 A. S. ZUKIN 2,740,888
DIODE GATING CIRCUITS
Filed March 13, 1952
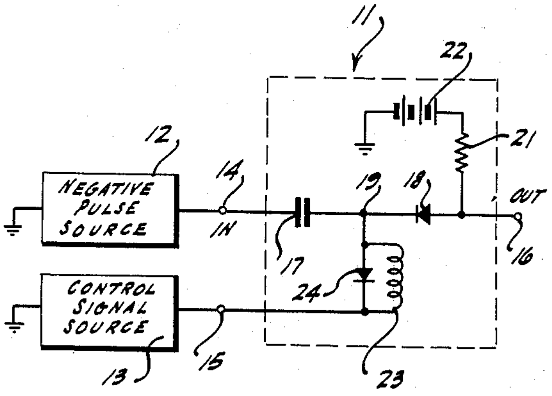
FIG. 1.
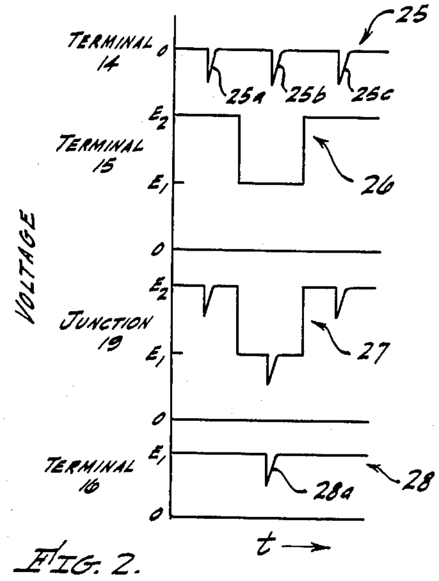
FIG. 2.
FIG. 4.
FIG. 3.
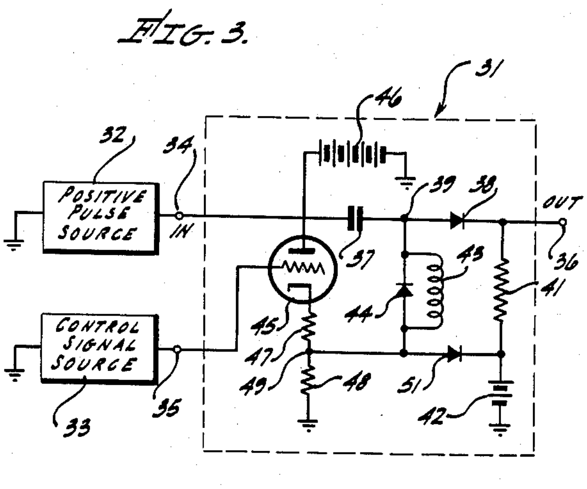
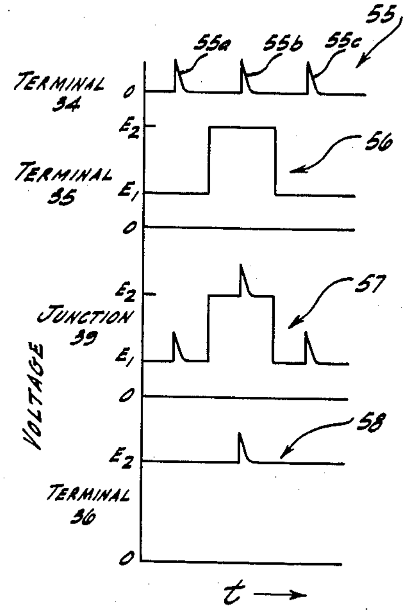
INVENTOR.
ARTHUR S. ZUKIN,
BY
Seymour M. Rosenberg
ATTORNEY.

United States Patent Office 2,740,888

Patented Apr. 3, 1956

2,740,888

DIODE GATING CIRCUITS

Arthur S. Zukin, Los Angeles, Calif., assignor, by mesne assignments, to Hughes Aircraft Company, a corporation of Delaware Application March 13, 1952, Serial No. 276,314

9 Claims. (Cl. 250—27)

The present invention relates to diode gating circuits and more particularly to diode gating circuits which turn on and turn off rapidly but impose relatively negligible loading upon the source of signals controlling the operation of the gating circuit.

In co-pending U. S. patent application Serial No. 276,254, by E. E. Bolles and A. D. Scarbrough, for "Diode Gating Circuits," filed March 13, 1952, now U. S. Patent 2,685,039, there is disclosed a diode gating circuit which turns on rapidly in response to a predetermined voltage level of the applied control signal. In this circuit, a diode is interposed between an input capacitor and an output terminal, one electrode of the diode being held at a relatively constant direct-current potential whose voltage level is substantially equal to the voltage level of the control signal at which the input pulses are to be passed. The voltage level of the potential at the other electrode of the diode is varied in accordance with the variation in the voltage level of the control signal, the diode connections being so arranged that the diode is back-biased whenever the voltage level of the control signal differs from the voltage level at which the pulses are to be passed.

Although the gating circuit of the above mentioned application turns on rapidly, as compared with prior art gating circuits, its turn-off time is relatively long as compared with the turn-on time. Accordingly, although the frequency of operation of this circuit is increased by making the turn-on time relatively short, the maximum frequency is now limited by the turn-off time. Furthermore, although the circuit is capable of passing any pulses occurring during the interval that the control signal is at its turn-on voltage level, it may also pass a pulse which occurs soon after the voltage at the diode electrode starts to return to its turn-off level in response to a corresponding change in the voltage level of the control signal. One method of decreasing the turn-off time of this gating circuit would be to decrease the capacity of the input capacitor. However, this results in a larger driving impedance, owing to the increase in capacitive reactance, and thereby requires larger input pulses for a given magnitude output pulse. Obviously, there is an upper limit to the magnitude of the input pulses in order to prevent passage of at least part of each of these pulses.

The present invention discloses gating circuits which overcome the above and other disadvantages of the above-mentioned gating circuit by making both the turn-on and turn-off times relatively short and, at the same time, maintain a low driving impedance for the gating circuit. According to the basic principle of this invention, the control signal source is coupled to the diode through a parallel combination of an inductor and another diode in order to provide a direct-current connection between the diode and the source for both the turn-on and turn-off periods. In this manner, the resistance of both the charging and discharging paths of the input capacitor is relatively low and, therefore, the time constants of these paths are relatively small.

It is, therefore, an object of this invention to provide a diode gating circuit which operates at relatively high frequency without imposing an excessive load upon the source of signals for controlling the operation of the gating circuit.

Another object is to provide a diode gating circuit in which the turn-off time and the turn-on time are both relatively short.

A further object is to provide a diode gating circuit which turns on and off rapidly and has a relatively low driving impedance.

Still another object is to provide a diode gating circuit in which a direct-current connection is provided between the control signal source and the diode gating the pulses.

A still further object of the invention is to provide a diode gating circuit in which relatively low resistance charging and discharging paths are provided for the input coupling capacitor.

The novel features which are believed to be characteristic of the invention, both as to its organization and method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only, and are not intended as a definition of the limits of the invention.

Fig. 1 is a circuit diagram of one embodiment of the diode gating circuit of this invention for passing negative pulses in response to a low voltage level of the potential of the control signal;

Fig. 2 is a composite diagram of the waveforms of signals appearing at various points in the circuit of Fig. 1;

Fig. 3 is a circuit diagram of another embodiment of the diode gating circuit of this invention for passing positive pulses in response to a high voltage level of the potential of the control signal; and Fig. 4 is a composite diagram of the waveforms of signals appearing at various points in the circuit of Fig. 3.

Referring now to the drawings, there is shown in Fig. 1 a diode gating circuit, generally designated 11, for gating the pulses applied from a negative pulse source 12 under the control of a signal applied from a control signal source 13, the control signal from source 12 being preferably of squarewave configuration. Circuit 11 includes an input terminal 14 connected to source 12, a control terminal 15 connected to source 13, and an output terminal 16.

Input terminal 14 is coupled to output terminal 16 through a series connection including a capacitor 17 having one plate connected to input terminal 14 and a diode 18 having an anode connected to output terminal 16, the other plate of capictor 17 and the cathode of diode 18 being connected together at a common junction 19. The anode of diode 18 is connected through a load impedance, such as a resistor 21, to the positive terminal of a source of direct-current potential, such as a battery 22, the other terminal of battery 22 being connected to ground.

Control terminal 15 is coupled to junction 19 through a parallel combination of an inductor 23 and a diode 24 which has its cathode connected to the control terminal. Diodes 18 and 24 are preferably crystal diodes of the semiconductor type such as germanium crystal diodes. The voltage of the potential from battery 22 is preferably substantially equal to the low voltage level of the square-wave signal from source 13, the voltage level of the control signal at which the pulses from source 12 are to be passed to output terminal 16.

In operation, referring now to Fig. 2, source 12 applies a signal 25 to input terminal 14, signal 25 including a plurality of negative pulses, such as pulses 25*a*, 25*b*, and 25*c*. Source 13 applies to control terminal 15 a square-wave signal 26 including alternate relatively high and relatively low voltage levels $E_2$ and $E_1$, respectively, level $E_1$ being substantially equal to the voltage level of battery 22.

Assume that signal 26 is initially at high voltage level $E_2$ and that circuit 11 has attained equilibrium so that the signal, generally designated 27, appearing at junction 19 is substantially at level $E_2$, as shown in Fig. 2. Since the direct-current potential applied to the anode of diode 18 is maintained substantially at low voltage level $E_1$, diode 18 will be back-biased under the assumed condition. Accordingly, upon application of pulse 25*a* the potential at junction 19 will drop sharply. However, if the maximum amplitude of pulse 25*a* is less than the difference between levels $E_2$ and $E_1$, the potential of the signal, generally designated 28, at output terminal 16 will remain constant owing to the blocking action of diode 18.

Assume now that the level of signal 26 drops sharply to low voltage level $E_1$ under which condition gating circuit 11 is intended to pass the negative pulse from source 12. Capacitor 17 now discharges rapidly through the relatively low resistance path including the forward resistance of diode 24 and the resistance of source 13, and the voltage level of signal 27 will drop sharply, as shown in Fig. 2, to low voltage level $E_1$. Under these conditions, the potentials at both electrodes of diode 18 will be at substantially the same voltage level, and, upon application of pulse 25*b*, diode 18 will be biased in the forward direction and will pass the pulse. Accordingly, a pulse 28*a* will appear at output terminal 16 whenever signal 26 is at low voltage level $E_1$.

When signal 26 returns to high voltage level $E_2$, diode 24 becomes back-biased and cannot provide a direct-current connection between junction 19 and terminal 15. In this instance, however, a direct-current connection is provided by the relatively negligible direct-current impedance of inductor 23. Accordingly, capacitor 17 will charge rapidly through inductor 23 and the impedance of source 13 and, with the proper selection of capacitor 17 and inductor 23, signal 27 at junction 19 will follow virtually instantaneously the sharp rise in signal 26, as shown in Fig. 2. For example, it has been found that with an inductor having an inductance of one millihenry and a capacitor having a capacitance of 700 micro-microfarads, the turn-off time of circuit 11 is approximately one microsecond, that is of the same order of magnitude as the turn-on time. This result may be compared with that of the gating circuit of the above-mentioned application in which the turn-off time is approximately 5 microseconds. For the reasons set forth in connection with pulse 25*a*, pulse 25*c* of signal 25 will be blocked by diode 18 and will not appear in signal 28.

It is, therefore, seen that the gating circuit of Fig. 1 turns on and off rapidly by providing a direct-current connection between junction 19 and terminal 15 for both the turn-on and turn-off periods. In addition, since the turn-off time is reduced considerably by this connection, the capacity of capacitor 17 may be increased, as compared with the capacitor of the gating circuit of the above-mentioned application. In this manner, the driving impedance of circuit 11, which includes the capacitive reactance of capacitor 17 and the forward resistance of diode 18, is less than that of the gating circuit of the earlier application for any given operating frequency. Furthermore, since diode 24 is back-biased by, and inductor 23 offers an extremely high impedance to, any pulse from source 12, source 13 is effectively isolated from the pulses from source 12. Accordingly pulse source 12 imposes negligible loading upon signal source 13.

It should be noted that circuit 11 of Fig. 1 is capable of operating at moderate frequencies even if diode 24 is eliminated. However, for high speed operation, it is preferable to employ diode 24 since the diode reduces the time constant associated with the discharge path of capacitor 17 and thereby reduces the turn-on time. In addition, during the turn-off period, diode 24 serves to damp out any ringing tendencies of inductor 23, that is the diode prevents the voltage swing across the inductor from becoming oscillatory.

Although the gating circuit of Fig. 1 is arranged to pass negative pulses under the control of the low voltage level of the control signal, it should be apparent that the invention may be applied to the gating of positive pulses. In addition, it may be desirable to further reduce the loading of the gating circuit on source 13 by decreasing the impedance of the control signal source. Furthermore, although the magnitude of the reference potential supplied by battery 22 has been described as substantially equal to the low voltage level of the control signal, in actual practice the reference potential voltage level is made slightly less than the low voltage level of the control signal in order to assure proper operation of the gating circuit in the event the low voltage level of the control signal decreases. As a result, diode 18 will be back-biased slightly during the on period and a portion of the pulse to be passed will not appear at the output terminal owing to this back-bias.

Referring now to Fig. 3, there is shown a diode gating circuit 31 according to this invention for gating positive pulses, circuit 31 being provided with means for decreasing the driving impedance and being arranged to pass the entire pulse. Circuit 31 is arranged to gate the positive pulses applied from a positive pulse source 32 to an input terminal 34 under the control of a signal applied from a control signal source 33 to a control terminal 35.

The pulses applied at terminal 34 are coupled to an output terminal 36 of circuit 31 through a series combination of an input capacitor 37 and a gating diode 38 having a cathode connected to output terminal 36 and an anode connected to a common junction 39 of the series combination. The cathode of diode 38 is connected through a load resistor 41 to the positive terminal of a source of direct-current reference potential, such as a battery 42, the other terminal of battery 42 being connected to ground. Junction 39 is connected to one end of a parallel combination including an inductor 43 and a diode 44 having a cathode connected to junction 39.

It will be noted that the elements of circuit 31 thus far described are identical with the corresponding elements of circuit 11 of Fig. 1, except that the connections of diodes 38 and 44 are reversed, as compared with diodes 18 and 24, respectively, of Fig. 1. In addition, as pointed out in more detail below, the voltage level of the reference potential from battery 42 is substantially equal to the high voltage level of the signal from source 33, instead of the low voltage level.

In order to decrease the loading of circuit 31 upon source 33, control terminal 35 is coupled to the anode of diode 44 through a cathode follower tube 45 having a grid connected to terminal 35 and an anode connected to the positive terminal of a source of direct-current potential, such as a battery 46, the other terminal of battery 46 being connected to ground. Tube 46 has a cathode connected to ground, or to a suitable source of negative potential (not shown), through a voltage divider including a pair of resistors 47 and 48, the voltage divider having common junction 49 connected to the anode of diode 44. Common junction 49 also is connected to the positive terminal of battery 42 through a diode 51 having a cathode connected to battery 42 and an anode connected to junction 49.

In operation, referring now to Fig. 4, source 32 applies to input terminal 34 a signal, generally designated 55, including a plurality of positive pulses such as 55*a*, 55*b*, and 55*c*, while source 33 applies to control terminal 35 a squarewave signal, generally designated 56, including alternate low and high voltage levels, $E_1$ and $E_2$, respectively. Owing to the cathode follower action of tube 45, the potential at junction 49 follows the potential at terminal 35 and is, therefore, of squarewave configuration.

For the reasons set forth above in connection with the description of operation of circuit 11, signals 55 and 56 will be combined at junction 39 to produce a signal, generally designated 57 in Fig. 3. Accordingly, with output terminal 36 held at a direct-current potential level of $E_2$ by battery 42, diode 38 will be back-biased whenever signal 56 is at its low voltage level and will block positive pulses 55*a* and 55*c*. On the other hand, when signal 56 is at its high voltage level $E_2$, the back-bias on diode 38 is removed and the diode passes pulse 55*b* of signal 55 to produce a signal, generally designated 58, at output terminal 36.

It is, therefore, seen that gating circuit 31 will pass positive pulses from source 32 whenever the signal from source 33 is at its high voltage level, and will block the pulses from source 32 whenever the signal from source 33 is at its low voltage level. In addition, owing to the action of cathode follower tube 45, the gating circuit 31 has a negligible effect upon the loading of source 33. This feature may be important when a number of gating circuits are to be controlled from a single control signal source. Furthermore, since diode 51 prevents the voltage level of the potential at junction 49 from rising above the voltage level of battery 42, it is unnecessary to hold the voltage level of battery 42 at a value greater than the high voltage level of signal 56. Accordingly, when signal 56 is at its high voltage level, diode 38 will be unblocked and will pass the entire pulse from source 32.

It is to be noted that the cathode of tube 45 is connected to the anode of diode 44 through resistor 47 which serves to provide cathode biasing for tube 45. Without such biasing, tube 45 will act as a diode and tend to pass at least a portion of any leakage pulse from source 32 that might appear at junction 49. In addition, the cathode biasing limits the plate current flowing through tube 45 to within the tube ratings.

It should be apparent that the expedients employed in circuit 31 of Fig. 3 may also be utilized in circuit 11 of Fig. 1 without departing from the spirit and scope of this invention. For example, a cathode follower circuit may be employed between terminal 15 and the parallel combination of inductor 23 and diode 24. In addition, a diode may be connected between diode 24 and battery 22, in order to prevent the voltage level of the potential at the cathode of diode 24 from falling below voltage level $E_1$ of battery 22. In this instance however, the diode connections would be reversed from those shown in Fig. 3, that is the anode of the diode would be connected to battery 22 and the cathode connected to the cathode of diode 24.

In both of the described embodiments of the invention, the control signal has been assumed to be periodic and of symmetrical squarewave configuration, and the pulse signal has been shown as periodic. It should be apparent, however, that the gating circuits of this invention are also applicable to aperiodic pulse signals, and to aperiodic or unsymmetrical control signals. In addition, each embodiment has been described as operable with a control signal having both voltage levels positive with respect to ground. Obviously, the circuits of this invention may be utilized with control signals in which either or both voltage levels are negative with respect to ground. Furthermore, although the output signal in each embodiment has been shown as including a direct-current voltage level, this level may be removed in any conventional manner, such as capacitive coupling between the output terminal and the output circuit.

What is claimed as new is:

1. A diode gating circuit for selectively passing applied electrical pulses in response to a predetermined voltage level of a variable voltage level control signal, said circuit comprising: a first diode having first and second terminals; means for applying the pulses to be passed to the first terminal of said first diode; first biasing means electrically coupled to the second terminal of said first diode for maintaining a direct-current potential at said second terminal at a voltage level substantially equal to said predetermined level; and second biasing means, electrically connected to said first terminal of said first diode and responsive to the control signal, for maintaining at all times the potential at said first terminal at a voltage level substantially equal to the instantaneous voltage level of the control signal, said second biasing means including an inductor, and a second diode connected across said inductor.

2. The gating circuit defined in claim 1, wherein said first diode has an anode and a cathode, the anode of said first diode being electrically coupled to said first biasing means.

3. The gating circuit defined in claim 1, wherein said first diode has an anode and a cathode, the cathode of said first diode being electrically coupled to said first biasing means.

4. The gating circuit defined in claim 1, which further includes a third diode electrically connected between said first and second biasing means for limiting the maximum value of the potential at said first terminal of said first diode to said predetermined voltage level.

5. A diode gating circuit for selectively gating applied electrical pulses, said circuit including a diode having first and second terminals; means for applying the pulses to be gated to the first terminal of said diode; a control signal source for producing a control signal having alternate relatively high and relatively low voltage levels; first biasing means, electrically connected between said source and said first terminal for varying the direct-current potential at said first terminal in accordance with the variations of the voltage level of the control signal; said first biasing means including an inductor having one end connected to said first terminal; and second biasing means, electrically connected to the second terminal of said diode for maintaining at said second terminal a direct-current potential of a voltage level substantially equal to one of the voltage levels of said control signal.

6. The gating circuit defined in claim 5, which further includes an additional diode, electrically connected between said second biasing means and the other end of said inductor, for preventing the direct-current potential at said first terminal from varying beyond said one voltage level of said control signal in a direction away from the other of the voltage levels of said control signal.

7. The gating circuit defined in claim 6, wherein said first biasing means further includes a cathode follower electrically coupled between said control signal source and said other end of said inductor.

8. The gating circuit defined in claim 7, wherein said first biasing means further includes a diode electrically connected across said inductor.

9. A diode gating circuit for passing electrical pulses applied to an input terminal when said electrical pulses coincide in time with electrical control signals applied to a control terminal, said circuit comprising: an oscillatory circuit connected between the input and control terminals for substantially reproducing the applied pulses and control signals at an output terminal of said oscillatory circuit, said oscillatory circuit including a capacitor connected between the input and output terminals, an inductor connected between the output and control terminals, and a first diode connected across said inductor; a second diode having first and second terminals, the first terminal of said second diode being connected to the output terminal; and biasing means connected to the second terminal of said second diode for normally maintaining said diode inoperable, said diode being rendered operable in response to each one of the control signals to pass the electrical pulses coinciding in time with said one control signal.

References Cited in the file of this patent

UNITED STATES PATENTS

| | | |
|---|---|---|
| 2,466,959 | Moore | Apr. 12, 1949 |
| 2,576,026 | Meacham | Nov. 20, 1951 |
| 2,618,753 | Van Mierlo | Nov. 18, 1952 |
| 2,636,133 | Hussey | Apr. 21, 1953 |

OTHER REFERENCES

Radiation Laboratory Series, vol. 19, pages 365–366; paragraph 10.2, by McGraw-Hill Co., published 1949.